United States Patent [19]

Weiser

[11] 4,241,996
[45] Dec. 30, 1980

[54] APPARATUS FOR MEASURING THE QUALITY OF OPTICAL EQUIPMENT

[75] Inventor: Sidney Weiser, Silver Spring, Md.

[73] Assignee: Exotech, Incorporated, Gaithersburg, Md.

[21] Appl. No.: 939,490

[22] Filed: Sep. 5, 1978

Related U.S. Application Data

[63] Continuation-in-part of Ser. No. 747,739, Dec. 6, 1976, abandoned.

[51] Int. Cl.³ .............................................. G01B 9/00
[52] U.S. Cl. ............................... 356/124.5; 356/126
[58] Field of Search .................. 356/124, 125, 124.5, 356/126

[56] References Cited

U.S. PATENT DOCUMENTS

| 2,773,413 | 12/1956 | Schade | 356/124 |
|---|---|---|---|
| 3,743,427 | 7/1973 | Weiser | 356/124 |
| 3,871,773 | 3/1975 | Shaw | 356/200 |

OTHER PUBLICATIONS

Walton et al., A Technique for Effectively Measuring MTF of Image Intensifiers at Low Output Levels, 1973.

Primary Examiner—John K. Corbin
Assistant Examiner—Rodney B. Bovernick
Attorney, Agent, or Firm—Roberts and Stout

[57] ABSTRACT

The invention is an apparatus for determining the quality of optical equipment through measurement of the modulation transfer function of the equipment. The apparatus includes an elongated, opaque sheet member or reticle, uniformly curved about an axis substantially perpendicular to the longitudinal centerline thereof, which has a data pattern comprising at least one bar pattern of discrete spatial frequency positioned longitudinally thereon. Each of the data patterns has optical transmission characteristics that vary periodically along its length according to a predetermined spatial frequency distribution. A rotatable mirror with its axis of rotation coincident with the center of curvature of the reticle is mounted so that it reflects an incident image onto the stationary reticle. An illuminated image producing source projects a slit image through optical equipment whose quality is to be determined to produce a spread function response of the optical equipment and the response is projected onto the rotatable mirror. The mirror is rotated to cause the spread function response to be reflected therefrom and sweep the data pattern so that the light transmitted through the data pattern is modulated by the interaction of the data pattern with the spread function response. The intensity of the transmitted, modulated light from the slit image is converted into an electrical data signal and the amplitude of the fundamental frequency components of the electrical data signal is determined. These measurements determine the modulation transfer function of the optical equipment under test.

13 Claims, 6 Drawing Figures

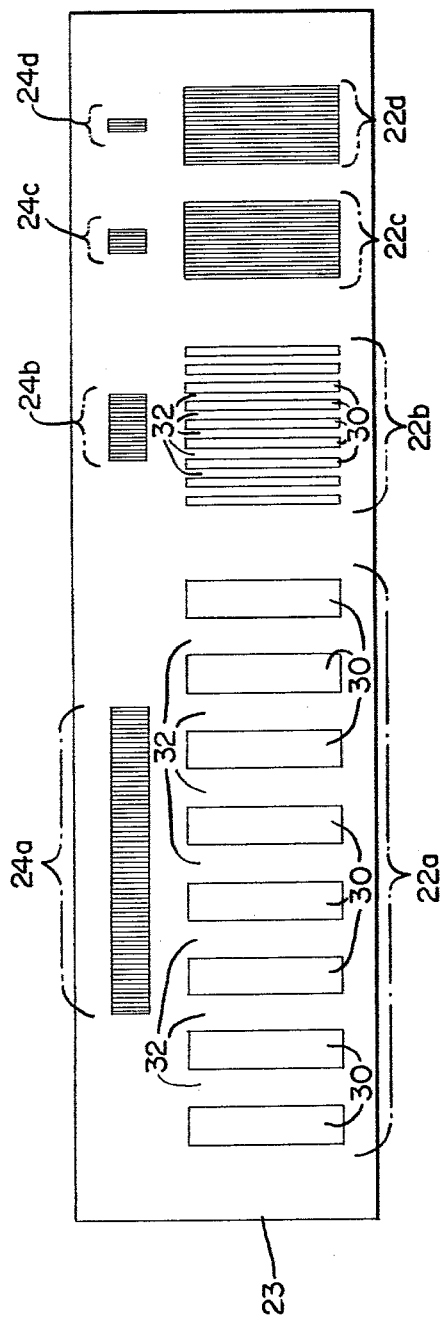
FIG. 2.
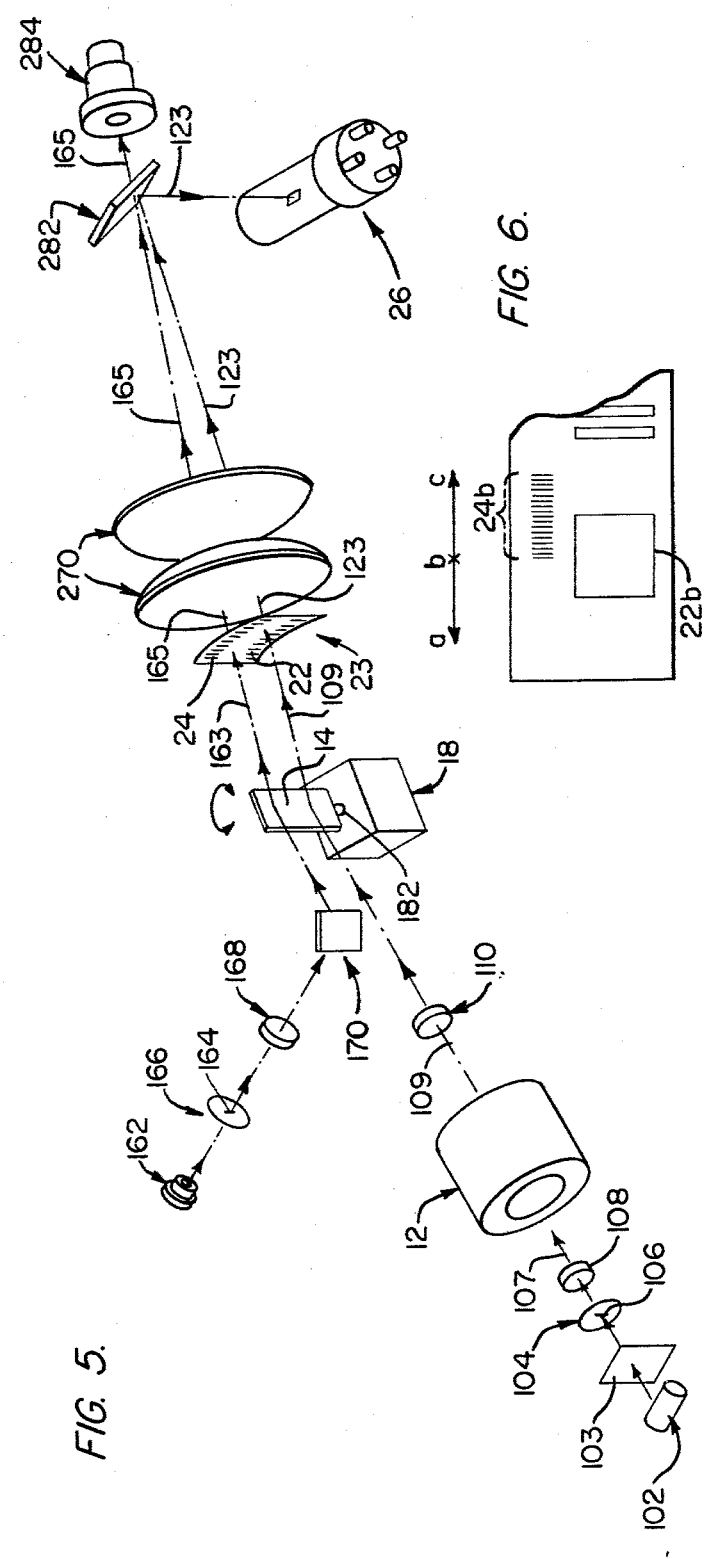
FIG. 5.
FIG. 6.

APPARATUS FOR MEASURING THE QUALITY OF OPTICAL EQUIPMENT

CROSS REFERENCE TO RELATED APPLICATION

This is a continuation-in-part of my co-pending application entitled Apparatus For Measuring The Quality of Optical Equipment, Ser. No. 747,739 filed on Dec. 6, 1976 now abandoned, the priority of which is claimed for the common subject matter.

FIELD OF INVENTION

The present invention pertains to optical measuring equipment. More particularly, the present invention pertains to an apparatus for and a method of determining the modulation transfer function of optical equipment.

The modulation transfer function, or MTF, of an optical component or of a combination of optical components is widely utilized as an indicator of the quality of the optical equipment. A discussion of the MTF and of prior art methods and apparatus for determining it can be found in U.S. Pat. No. 3,743,427, issued to Sidney Weiser, July 3, 1973. One generally accepted technique for determining the MTF of optical equipment is to pass an image of a narrow illuminated slit through the optical equipment under test. The received slit image is thereby degraded by factors indicative of the quality of the optical equipment and becomes a "spread function". This spread function is then scanned by a data or test pattern and the light received through the pattern is converted into an electrical signal which thus is a periodic wave form from which the MTF can be determined.

Measuring MTF at the very low light levels associated with certain optical components, such as image intensifier tubes, involves special problems. At this low light level the signal-to-noise ratio of the device under test may be so low that special techniques are needed for repeatable and accurate measurements. One of these techniques, signal averaging, requires very precise scanning since a phase shift between repetitions of the signal being averaged, will degrade the data. Thus very stringent repeatability demands are imposed on the MTF Measuring system.

The present invention is an apparatus for and a method of determining the modulation transfer function of optical equipment. The present invention employs a number of novel features and provides improved repeatability of measurements. While the present invention is particularly suited for very low light level measurements as compared to existing equipment, and is also particularly suited to signal averaging, the present invention is also useful for measurements at higher light levels where signal averaging is not needed.

PRIOR ART

An MTF test system is disclosed in my prior U.S. Pat. No. 3,743,427. An improved version of this machine was disclosed in a paper co-authored by the inventor before the Society of Photooptical Instrumentation Engineers in August 1973 entitled *A Technique for Effectively Measuring MTF of Image Intensifiers at Low Output Levels*, in Proceedings, Vol. 42, pp. 35–42.

The above identified improved prior art machine has the following elements in common with the present invention. A quartz iodine light source, a diffuser, a slit assembly, an input relay lens focusing the slit image on the optical equipment under test, an output relay lens bar batterns on a film strp, and a photomultiplier tube to receive the light passing through the above elements.

The said machine has the bar patterns on a rotating drum which is aligned so that the bars are parallel to the axis of rotation and the spread function light beam impinges normal to the tangent plane of the surface of the drum, passes through the transparent portions and is thereafter detected by the photomultiplier tube. The image is only sharply focused on axis since the drum curves the pattern away from the plane of sharpest focus.

The said machine also contained a conventional optical shaft encoder which produced 48 thousand pulses per revolution. A multivibrator gave an additional two pulses per encoder pulse, giving 144,000 pulses per revolution.

U.S. Pat. No. 2,773,413 discloses an optical measuring device which sweeps a line image across a fixed slit, the light passing through the slit being read by a detector. Several methods of sweeping the beam are disclosed including in FIG. 3(d) directing the beam, after it leaves the test element, onto a rotation drum containing mirrors on the surface, or alternatively in FIG. 3(e) onto three mirrors, one of which reciprocates. Both sweep the beam across the fixed and stationary reticle containing a slit.

U.S. Pat. No. 3,871,773 discloses a system for measuring defects in float process glass. This system requires a coherent laser beam which is passed through a beam splitter and directed onto an oscillating directional mirror, that sweeps one of the beams across a concave mirror, reflecting the beam, to the test glass and into the first detector, while the second beam is reflected from a measuring scale to a second detector to locate the position of the defect.

SUMMARY OF INVENTION

In accordance with the present invention, a light source projects an image, e.g., a slit or a point, as an input to the optical equipment under test and this image exits in a degraded form referred to as a "spread function". The spread function is reflected by a mirror to focus on and sweep across, a stationary reticle having thereon at least one data pattern, e.g., bar patterns of discrete spatial frequencies, by rotation or other mirror movement. The data patterns are made up of a plurality of cycles consisting of alternating optically transparent openings (called "windows") and opaque areas (called "bars") and are disposed on the arc of a cylinder having the rotatable mirror at its center of curvature. Typically, each bar pattern is a series of alternating windows and bars of uniform length and width, with the different patterns having windows and bars of different widths. However, a single medium of varying opaqueness can be used, e.g., a pattern having a sinusoidal transmission characteristic or a single transparent data track of sinusoidally varying width can be used. In the preferred embodiment, a slit image is passed through the optical equipment under test and the mirror is rotated to cause the spread function to sweep the data pattern, or plurality of patterns, so that the light of the spread function passing through the stationary medium is modulated by interaction with the bar pattern. In this system, the data patterns are on an elongated, opaque sheet member uniformly curved about an axis substantially perpendicular to the longitudinal centerline thereof, and the optical axis of the equipment under test. By this construction, the distance from the mirror to the sheet member is uniform, which is of importance since very small variations in this distance will degrade the signal so that true MTF cannot be measured. At least one data pattern will be positioned longitudinally on the member. The convolution of the spread function, swept by the galvanometer, with the spatial frequency of the data pattern modulates the light passing through stationary reticle to a condensing lens and to a photodetector. The photodetector output thus provides a data signal which has for each of the bar patterns a fundamental temporal frequency determined by the spatial frequency of the particular bar pattern and the angular velocity of the rotatable mirror, as well as having higher order harmonic components. The galvanometer velocity can also be changed for each data pattern to produce the same temporal frequency and simplify the data reduction. A conventional method for collecting light from various points along a pattern is to re-image the exit pupil of the relay optics on the detector. This method would cause the collected light to move back and forth across the detector as the galvanometer mirror is rotated. A unique feature of this invention is that the galvanometer mirror is used as the object plane for the condensing lens so that the image motion is stabilized on the photodetector. Experimental evidence has confirmed that the illuminated area on the detector does not move as the galvanometer rotates.

In the preferred embodiment, a second slit image source provides another slit image which is also reflected by the rotatable mirror. This second slit image is not passed through the optical equipment under test. In an undegraded form, it is reflected to a series of clock track bar patterns on the stationary reticle adjacent the data on signal track bar patterns. Each clock track bar pattern is similar to a data pattern, e.g., made up of alternating transparent and opaque strips, and has a frequency that is a fixed multiple of a uniquely associated data track pattern. The light passing through the clock track bar patterns is collected and passed to a detector which produces a series of clock pulses. The intensity of this light is independent of the light passing through the optical equipment under test. Therefore, when the data signal is obscured by noise, etc., the clock signal can be used to select portions of the data signal in a known phase relationship to the data pattern. This sampling also makes taking measurements with this device independent of repeatability of mirror position as a function of time to eliminate errors in measurement caused by variations in mirror velocity and physical movement. The data signal from the signal track photodetector is passed to a digitizer and the clock pulses are used to instruct the digitizer to sample the data signal at several times corresponding to fixed spatial locations within each cycle of the bar pattern. The thus digitized signal is stored for subsequent processing. For low light level measurements, the sweep of the rotating mirror is repeated several times, with the sampling taking place at the same spatial points of each sweep, and the corresponding digitized values for the several sampling points are summed, thereby improving the signal-to-noise ratio.

The stored digital signals are used to reconstruct the signal waveform, and this waveform is filtered to pass only the fundamental frequency. The peak amplitude of the fundamental temporal frequency for a given spatial frequency is normalized by dividing by the calibration amplitude to give the modulation amplitude for that spatial frequency. The modulation amplitude for a plurality of frequencies describes the curve of the modulation transfer function.

In the preferred embodiment, the lowest spatial frequency pattern is used as the calibration frequency. This frequency should be as low as possible, preferably one-tenth the frequency of the next associated bar pattern, but the physical dimensions of the pattern are limited by the geometry of the optical system. If the calibration frequency is made as low as is desirable, the length of the pattern is such that only one or two cycles of the calibration frequency can be included. Also, the mirror is limited in the angle it can deflect. This presents a problem since, in the preferred embodiment, the electrical filter that separates the fundamental from the signal requires several cycles of data to reach a steady state. This problem is circumvented in the preferred embodiment by providing only a single data cycle of the calibration frequency on the pattern, and repetitively clocking the data sampled by the galvanometer sweep routine so that the values out of the memory of the signal averager, thus produce a periodic waveform input to the filter. The mirror rotation required in the preferred embodiment can be reduced by providing clock-track windows on the pattern for only one-half of this single calibration cycle, from the center of the bar to the center of the window. Since the other half of the cycle is mirror-symmetrical, synthesis of the whole cycle from this partial information and data taken from two half-cycles are combined by first scanning across the half-cycle in one direction, and then scanning back again in the opposite direction, thus reversing the order in which the data samples are taken at the command of the clock track.

DESCRIPTION OF DRAWINGS

These and other aspects and advantages of the present invention are more apparent in the following detailed description, particularly when considered in conjunction with the accompanying drawings in which like parts bear like reference numerals. In the drawings:

FIG. 2 is a detailed view of a bar pattern suitable for use in an optical evaluation system in accordance with the present invention;

FIG. 5 depicts a preferred embodiment of the optical portion of an optical evaluation system in accordance with the present invention, and FIG. 6 depicts a single-cycle calibration pattern.

STRUCTURE OF DISCLOSED EMBODIMENT

Figure 1:
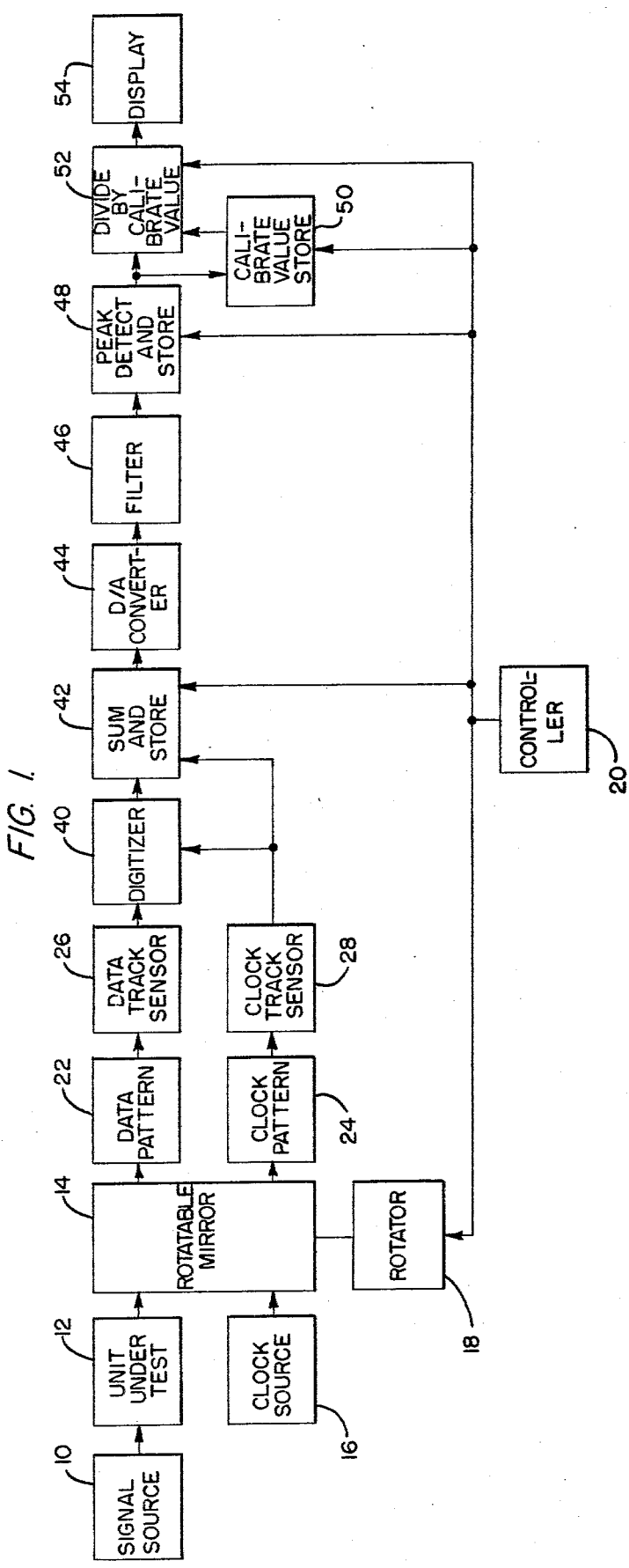
FIG. 1 is a block diagram of an optical evaluation system in accordance with the present invention.

In the preferred form of the invention illustrated in FIG. 1, a slit image from signal source 10 passes through the unit 12 under test. The slit image is degraded in passing through unit 12 to produce an optical spread function, which is passed to rotatable mirror 14. Simultaneously, a second slit image from clock source 16 passes to rotatable mirror 14. Rotatable mirror 14 is rotated by rotator 18 under the control of controller 20.

As a consequence, the spread function from test unit 12 is swept across data pattern 22 while the slit image from clock source 16 is swept across clock pattern 24. The output emerging from data pattern 22 is detected by data track sensor 26, while the output from clock pattern 24 is detected by clock track sensor 28.

FIG. 2 depicts a preferred form of data pattern 22 and clock pattern 24. An opaque sheet or reticle 23 is provided with a plurality of data track bar patterns 22a, 22b, 22c, .... Within each bar pattern 22a, 22b, 22c, ... a plurality of equal-length transparent strips or openings 30 alternate with opaque areas 32 of the same length and width. Since within each bar pattern the widths of the openings 30 and the closed area 32 are equal, the spatial frequency of the pattern is uniform; however, the several bar patterns 22a, 22b, 22c, ... have different discrete spatial frequencies. Controller 20 controls rotator 18 so that the output from data track sensor 26 for each spatial frequency has approximately the same duration. Preferably, each data track bar pattern 22a, 22b, 22c, ... includes at least ten openings 30. By way of illustration, bar pattern 22a may have a spatial frequency of 0.25 cycles per millimeter, bar pattern 22b a spatial frequency of 2.5 cycles per millimeter, bar pattern 22c a spatial frequency of 7.5 cycles per millimeter, etc.

Adjacent to each data track bar pattern 22a, 22b, 22c, ... on reticle 23 is an associated clock track bar pattern 24a, 24b, 24c, .... Each clock track bar pattern likewise is made up of alternating equal-length transparent strips or openings and opaque strips. The spatial frequency of each clock track bar pattern 24a, 24b, 24c, ... is a fixed multiple of the spatial frequency of its associated data track bar pattern 22a, 22b, 22c, .... Thus, for example, each clock track bar pattern 24a, 24b, 24c, ... may include twenty transparent openings and twenty opaque strips per cycle of the corresponding data signal bar pattern 22a, 22b, 22c, ..., having ten equally spaced clock track openings for each signal track opening 30 and ten equally spaced clock track openings for each opaque strip 32.

Reticle 23 is on a curved cylindrical surface having the rotatable mirror 14 positioned at its center of curvature so that as mirror 14 rotates, the data slit image spread function and the clock slit image travel uniform distances to sweep the length of the signal track bar patterns 22a, 22b, 22c, ... and the clock track bar patterns 24a, 24b, 24c, ... on reticle 23.

Figure 4:
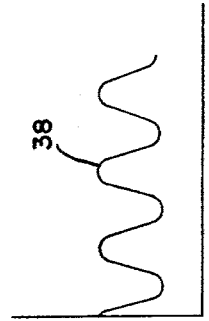
FIG. 4 illustrates the output light signal as received by the signal track sensor in the system of FIG. 1 during testing of an actual optical component.
Figure 3:
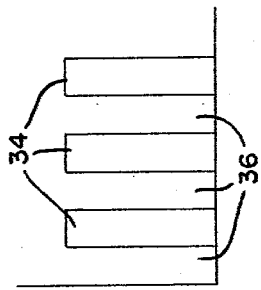
FIG. 3 illustrates the output light signal as received by the data track sensor in the system of FIG. 1 during testing of a theoretically perfect optical component.

For an ideal unit 12 under test the intensity of the light emerging from the data track bar patterns 22 and detected by data track sensor 26 would approximate a square wave, as illustrated in FIG. 3, made up of alternating periods 34 of maximum intensity, as the spread function from rotatable mirror 14 traversed a transparent 30, and periods 36 of minimum or zero intensity, as the spread function from rotatable mirror 14 traversed an opaque strip 32. In practice, with an actual optical component such as the unit 12 under test, the image exiting the unit 12 is degraded, and consequently the spread function emerging from the data track bar patterns 22 and detected by data track sensor 26 is a periodic wave such as illustrated by waveform 38 in FIG. 4.

The element alternatively termed a rotator 18 or a galvanometer 18 must possess a low inertia and have a fast response time. This allows a scan at a controlled rate over a controlled position. In the disclosed embodiment a closed loop or servo-controlled galvanometer is used so that a signal indicative of actual position is continuously combined with the input signal to control both rate and position of the galvanometer.

An open loop galvanometer may also be used with the servo control being the clock track signal, which is fed into controller 20. A third alternative is to dispense with the servo control of the galvanometer and sweep the mirror under control of the input signal alone. The mirror may rotate at a fixed rate and the instrument may contain a band pass filter responsive to each pattern. Alternatively the instrument may contain a single signal detecting filter and the galvanometer may be driven at different scan rates in response to each bar pattern.

Data track sensor 26 applies the periodic signal 38 to the signal input of a digitizer 40. Clock track sensor 28 generates a number of separate clock pulses for each cycle of the periodic signal 38, e.g., twenty in the above-described example, and these clock pulses are applied to the gate input of digitizer 40 so that the digitizer samples the amplitude of the periodic signal 38, e.g., twenty times per cycle. Preferably, as illustrated in FIG. 2, each clock track bar pattern 24a, 24b, 24c, ... is positioned adjacent only to the central portion of the associated signal track bar pattern 22a, 22b, 22c, .... The digitized amplitude values are applied to a sum-and-store circuit 42 which is clocked by the clock pulses from sensor 28 to store these values for subsequent processing under the control of controller 20. Since sum-and-store circuit 42 is triggered by the clock pulses, the digitized signal values are stored "without hiatus", and the remainder of the signal 38 is dropped out, e.g., as if the input to digitizer 40 were a continuous waveform.

If it is desired to repeat the sampling, for example, during operation at low light levels, the position of the clock track bar patterns 24 adjacent to the signal track bar patterns 22 results in the sampling of the amplitude of the periodic waveform 38 being done at the same point in the periodic waveform. The corresponding waveform values then are summed by sum-and-store circuit 42, thereby signal averaging and so improving the signal-to-noise ratio.

When the MTF is to be determined from the stored digitized signals in sum-and-store circuit 42, controller 20 causes sum-and-store circuit 42 to apply the stored signals through digital-to-analog converter 44 and filter 46. Digital-to-analog convertor 44 converts the stored digital signals to a continuous analog waveform which comprises the reconstructed waveform from the output of data track sensor 26 or the waveform represented by the summation of the data track sensor 26 outputs over several runs, but in either instance, without any interval between the output waveforms representing the different data track bar patterns 22a, 22b, 22c .... Filter 46 passes the fundamental frequency of this waveform, providing for the MTF to be obtained in an analog manner.

The output from filter 46 is thus a periodic wave at the fundamental frequency of waveform 38. This periodic wave includes separate data portions, one data portion associated with each of the data track bar patterns 22a, 22b, 22c, .... Each data portion has an amplitude indicative of the degradation of the optical signal as it passes through the associated data track bar patterns 22a, 22b, 22c, .... The lowest spatial frequency data pattern is used as a calibration frequency. The calibrate portion closely approaches the 100% modulated waveform that would be obtained from a theoretically perfect optical component, as illustrated in FIG. 3.

The calibrate data may also be generated in other manners.

Controller 20 causes peak detect and store circuit 48 to detect the maximum or peak amplitude of the calibrate frequency and to store this peak value until a higher peak value comes along. It then holds this second peak value until another, higher peak value is read, ending up with the highest peak values for that frequency at the end of the data and at that time (end of data) that peak value will be transferred to store circuit 50. Controller 20 then causes peak detect and store circuit 48 to detect and store the peak value of the periodic wave portion associated with a pre-selected one of the data track bar patterns 22a, 22b, 22c, . . . . These peak values are each proportional to a modulation amplitude on the MTF curve. Once these values have been stored, controller 20 causes the value to be applied to divide circuit 52 and causes calibrate store circuit 50 to apply the stored calibrate portion peak value to divide circuit 52 so that the selected data track bar pattern peak value is divided by the calibrate portion peak value to give the modulation amplitude at that discrete spatial frequency, i.e., a point on the MTF curve. Divide circuit 52 applies the resulting modulation value to display device 54 on which it is displayed. Thus, the modulation associated with any signal track bar pattern spatial frequency can be determined by controller 20 selecting the appropriate data track bar pattern 22a, 22b, 22c, . . . to have its peak value applied to divide circuit 52. This data reduction may also be accomplished in a completely digital manner.

The lowest spatial frequency data pattern is used as the calibration frequency. If the calibration frequency is made as low as is desirable, the length of the pattern is such that only one or two cycles of the calibration frequency can be included on member 23. In the preferred embodiment, only a single data cycle, 22b in FIG. 6, of the calibration frequency is provided for the pattern on member 23 and the mirror is rotated across this single data pattern to provide a scan. By repetitively clocking the sampled and digitized values out of the memory of the sum-and-store unit 42, a periodic waveform input to the filter is provided. The mirror rotation required in the preferred embodiment can be further reduced by providing clock-track windows 24b on the pattern for only one-half b-c of this single calibration cycle a-b-c from the center of the window b to the center of the bar c as shown in FIG. 6. The assumption is made that the other half of the cycle a-b is mirror-symmetrical, allowing synthesis of the whole cycle from this partial information, and data taken from two half-cycles b-c are combined by first scanning across the half-cycle in one direction, i.e., c-b, and then scanning back b-c in the opposite direction, thus reversing the order in which the data samples are taken at the command of the clock track.

FIG. 5 is a schematic representation of a preferred implementation of the optical portion of an optical evaluation system in accordance with the present invention. Signal source 10 includes a light source 102, diffuser 103, a plate 104 having a slit 106 therethrough for passage of light from source 102, and a relay lens 108. Diffuser 103 renders the light falling on the slit incoherent. The slit image 107 of slit 106 is projected onto the input plane of the optical unit 12 under test and is reproduced in degraded form as a spread function 109 at the output plane of optical unit 12. The image of the spread function 109 is relayed by lens 110 to rotatable mirror 14 which is mounted on the shaft 182 of galvanometer 18 for rotation therewith. Controller 20 is connected to galvanometer 18 to apply a drive voltage thereto. Thus, rotatable mirror 14 is positioned by galvanometer 18 in accordance with control signals from controller 20. The spread function image is reflected by mirror 14 to focus on the data track bar patterns 22 on reticle 23. Controller 20 causes galvanometer 18 to rotate mirror 14 so that the spread function image sweeps across each of the data track bar patterns 22a, 22b, 22c, . . . . The modulated light 123 passing through the data track bar patterns is collected by condensing lens system 270 and reflected from a dichroic mirror 282 to a photomultiplier tube 26.

The degraded slit image from test unit 12 is reflected by mirror 14 and focused on the bar pattern 22 of the elongated uniformly curved opaque sheet or reticle 23. Expressed differently, the light from the test unit is at a first focal point, and the reticle is at a second focal point of the exit relay lens 110. The axis of rotation of the mirror 14 is at the center of curvature of reticle 23 to ensure a constant distance from the test element 12 to the reticle during the scan of the mirror.

The center of rotation of mirror 14 is at a first focal point and the detector 26 is at a second focal point of the condensing lens 270.

Clock signal source 16 includes a light source 162, such as an infrared light emitting diode, which illuminates a slit 164 in a plate 166. The slit 164 is imaged by lens 168 to reflect image 163 off auxiliary mirror 170 to rotatable mirror 14, coming to focus on the clock track bar pattern 24 on reticle 23. This image sweeps across all of the clock track bar patterns 24a, 24b, 24c, . . . , and the light 165 passing through these patterns is collected by condensing lens system 270 and directed through dichroic mirror 282 to be detected by an appropriate detector 284 such as a silicon detector. The dichroic mirror transmits the infrared clock signal 165 to silicon detector 284 and reflects the visible data signal 123 to photomultiplier 26. Photomultiplier 26 has its output applied to the signal input of digitizer 40 while silicon detector 284 has its output applied to the gate input of digitizer 40.

SPECIFIC EXAMPLE

The following are the actual structures, specifications, and features of an MTF tester built in accordance with this invention.

Light Source

Color Temperature—3254° K.
Watts—45

Diffuser

Integrating sphere

Test Slit

Size—50 μm × 1.5 mm

Input Relay Lens

Magnification—0.1×
Numerical Aperture—0.32

Output Relay Lens

Magnification—6.3×
Numerical Aperture—0.2

Clock Light Source

Wave Length—9300 A
Output power—250 mW

Clock Slit

Size—4 μm × 1 mm

Clock Relay Lens

Focal Length—40 mm
Size—19 mm diam.

Rotatable Mirror

Size—1 inch square
Minimum angle input ray—33°
Maximum angle input ray—57°

Galvanometer

Maximum scan rate—25 per second

Test Pattern

Length—78 mm
Distance from mirror—100 mm
Size of theoretical image—31.5 um × 9.45 mm
Size of clock image—12 um
Size of calibrate pattern—6.3 mm × 12.7 mm
Size of first pattern—1.26 mm × 12.7 mm
Number of first pattern bars—11
Size of first clock pattern—0.126 mm × 6.35 mm
Size of second pattern—0.42 mm × 12.7 mm
Number of second pattern bars—13
Size of second clock pattern—0.042 mm × 6.35 mm
Size of third pattern—0.21 mm × 12.7 mm
Number of third pattern bars—18
Size of third clock pattern—0.021 mm × 6.35 mm
Size of fourth pattern—0.126 mm × 12.7 mm
Number of fourth pattern bars—37
Size of fourth clock pattern—0.013 mm × 6.35 mm

Condensing Lens

Focal length—80 mm
Size—90 × 120 mm

Clock Detector

EG & G Model 444A

Photomultiplier

RCA Model PF1006

Typical Test Procedure

Number of Scans—128
Scan Time per Procedure—5 sec
Light level—$5 \times 10^{-4}$ FC Positions of several of the components of FIG. 5 can be changed if desired. Thus, by way of example, an illuminated stationary bar pattern with a scanning galvanometer mirror at its center of curvature can replace plate 104 and slit 106. Then a single stationary slit can be utilized in place of the present signal track bar patterns 22, with appropriate changes in the other optical elements. If desired, light source 162 can be an ultraviolet light source rather than an infrared light source. Alternatively, visible light could be utilized in clock source 16, with suitable baffling to prevent interaction between the signal track and clock track optical systems. The direction of light propogation for the clock track may be reversed with the light source being located on the same side of sheet 23 as is photomultiplier 26 and with the clock track sensor being located on the side of slit 164 opposite rotatable mirror 14. Divide circuit 52 of FIG. 1 may utilize either an analog or a digital division technique.

A further application of this invention is measuring the MTF of electro-optical systems with a characteristic scan or sweep rate, such as television systems and forward-looking infrared scanners. An input signal, which may be optical (e.g., an infrared slit image in the case of a forward-looking infrared scanner) or electrical (e.g., composite television signals) is applied to the system under test and the galvanometer sweep rate is synchronized with the scan rate of the system under test so that the MTF measurements are made synchronously with the generation of an optical output by the system under test.

Thus, it is seen that while the present invention has been described with reference to a preferred embodiment, modifications and rearrangements could be made and still the result would come within the scope of the invention.

It is claimed:

1. In a system for determining the quality of optical equipment, apparatus comprising:

(a) an elongated, opaque reticle having a data pattern comprising at least one bar pattern of discrete spatial frequency, positioned longitudinally thereon, each discrete one of said patterns having optical transmission characteristics that vary periodically along its length according to a predetermined function;

(b) a mirror, said reticle being mounted stationary with respect to the mirror;

(c) source means for projecting light through optical equipment whose quality is to be determined to produce a spread function, and means for projecting the spread function response to said optical equipment onto said mirror to be reflected therefrom;

(d) means for moving said mirror to cause the spread function response reflected therefrom to sweep said data pattern so that the light transmitted through the data pattern is modulated by the interaction of said data pattern with the spread function response as the mirror moves;

(e) means for converting the intensity of the transmitted, modulated light from said source means into an electrical data signal, said data signal being indicative of the quality of the optical equipment;

(f) a clock pattern on said sheet member for each said data pattern, each clock pattern having a discrete spatial frequency which is a fixed multiple of the spatial frequency of a uniquely associated data pattern, said clock pattern having optical transmission characteristics that vary periodically along its length according to a predetermined function;

(g) a second slit image source means for projecting a second slit image from said second source onto said mirror so that said second slit image is reflected from said mirror onto said clock pattern, said means for moving said mirror causing said reflected second slit image to sweep said clock pattern so that the light transmitted through the clock pattern is modulated by the interaction of said clock pattern with the second slit image as the mirror moves;

(h) means for converting the intensity of the transmitted, modulated light from said second slit image into an electrical clock signal; and (i) means for using said clock signal to sample said data signal at predetermined intervals.

2. Apparatus as defined in claim 1 further including means for determining the amplitude of the fundamental frequency component of said data signal.

3. Apparatus as defined in claim 2 further comprising:
a means for using said clock signal to sample said data signal at predetermined intervals, at sampling intervals determined by a predetermined component of said clock signal, whereby the electrical samples from said data signal comprise the input to said means for determining the amplitude of the fundamental frequency component of said data signal.

4. Apparatus as defined in claim 3 wherein the amplitude determining means includes means for summing and storing the electrical samples from a plurality of data signals obtained by sweeping the same data pattern a plurality of times with the electrical samples being taken from the same spatial points of each sweep of the data pattern.

5. Apparatus for determining the quality of optical equipment comprising:
(a) an elongated, opaque sheet member uniformly curved about an axis substantially perpendicular to the longitudinal axis thereof and having a data pattern comprising at least one bar pattern of discrete spatial frequency positioned longitudinally thereon, each of said patterns having optical transmission characteristics that vary periodically along its length according to a predetermined function;
(b) a rotatable mirror positioned for rotation about an axis coincident with the sheet member axis of curvature, said sheet member being mounted stationary with respect to the rotatable mirror;
(c) a slit image source means for projecting a slit image from said source through optical equipment whose quality is to be determined to produce a spread function, and means for projecting the spread function response of said optical equipment to said slit image onto said rotatable mirror to be reflected therefrom;
(d) means for rotating said rotatable mirror to cause the spread function response reflected therefrom to sweep said data pattern so that the light transmitted through the data pattern is modulated by the interaction of said data pattern with the spread function response as the mirror rotates;
(e) means for converting the intensity of the transmitted, modulated light from said slit image into an electrical data signal;
(f) means for determining the amplitude of the fundamental frequency component of said electrical data signal;
(g) a clock pattern on said sheet member for each said data pattern, each clock pattern having a discrete spatial frequency which is a fixed multiple of the spatial frequency of a uniquely associated data pattern, said clock pattern having optical transmission characteristics that vary periodically along its length according to a predetermined function;
(h) a second slit image source means for projecting a second slit image from said second source onto said rotatable mirror so that said second slit image is reflected from said mirror onto said clock pattern, said means for rotating said mirror causing said reflected second slit image to sweep said clock pattern so that the light transmitted through the clock pattern is modulated by the interaction of said clock pattern with the second slit image as the mirror rotates;
(i) means for converting the intensity of the transmitted, modulated light from said second slit image into an electrical clock signal; and
(j) means for electrically sampling said data signal at predetermined intervals, the sampling intervals being determined by a predetermined component of said clock signal, whereby the electrical samples from said data signal comprise the input to said means for determining the amplitude of the fundamental frequency component of said data signal.

6. Apparatus as defined in claim 5 wherein the slit image source means projects a slit image derived from an incoherent light source.

7. Apparatus as defined in claim 5 wherein the second slit image source means projects a second slit image of light having a different wavelength than first-mentioned said slit image.

8. Apparatus as defined in claim 7 wherein the second slit image is an infrared image and the first-mentioned said slit image is incandescent light.

9. A process for determining the quality of optical equipment apparatus utilizing an elongated, opaque sheet member having at least one data pattern positioned longitudinally thereon, each of said patterns having optical transmission characteristics that vary periodically along its length according to a predetermined function and a mirror mounted stationary with respect to the sheet member and equidistant from each part of said data pattern; said process comprising projecting light through the optical equipment whose quality is to be determined to produce a spread function, projecting the spread function response of said optical equipment onto said mirror to be reflected therefrom, moving said mirror to cause the spread function response reflected therefrom to sweep each said data pattern so that the light transmitted through the data pattern is modulated by the interaction of said data pattern with the spread function response as the mirror moves, converting the intensity of the transmitted, modulated light from said source means into an electrical data signal comprising a periodic wave for each said data pattern, determining the amplitude of the fundamental frequency component of each said periodic wave, determining the peak value of each periodic wave and dividing each peak value by a calibrate value to obtain a modulation point for each data pattern indicative of the quality of the optical equipment, said calibrate value comprising the peak value of the one of said data patterns having the lowest spatial frequency; a clock pattern on said sheet member for each said data pattern, each clock pattern having a discrete spatial frequency which is a fixed multiple of the spatial frequency of a uniquely associated data pattern, said clock pattern having optical transmission characteristics that vary periodically along its length according to a predetermined function and further comprising projecting a second slit image onto said mirror so that said second slit image is reflected from said mirror onto said clock pattern, moving said mirror to cause said reflected second slit image to sweep said clock pattern so that the light transmitted through the clock pattern is modulated by the interaction of said clock pattern with the second slit image as the mirror moves, converting the intensity of the transmitted, modulated light from said second slit image into an electrical clock signal, and sampling said data signal at predetermined intervals determined by the clock signals, the electrical samples from said data signal comprising the signal from which the amplitude of the fundamental frequency component of said data signal is determined.

10. A process as defined in claim 9 wherein a plurality of data signals are obtained by sweeping the same data pattern a plurality of times and summing and storing the electrical samples taken from the same spatial points of each sweep of the data pattern to provide the signal from which said amplitude is determined whereby the measurement is obtained for low light levels.

11. A process as defined in claim 9 wherein the calibrate frequency data pattern comprises one cycle of said predetermined function and the periodic wave for the calibrate frequency is obtained by sweeping said one cyle a plurality of times and combining the electrical data signal for one-half said one cycle taken in one direction of the sweep with electrical data signal for the second half of said one cycle taken in the reverse direction of the sweep.

12. In a system for measuring the modulation transfer function of an optical element including,
  (a) means for generating a light beam,
  (b) means for creating a slit image of said light beam,
  (c) means to project said slit image along the axis of a test element such that said slit image will be degraded by the test element into a spread function.
  (d) means to relay the image of the spread function to a data pattern,
  (e) means to sweep the image of the spread function across said data pattern,
  (f) means to measure the intensity of the light passing through said data pattern,
  the improvement comprising:
  (g) a mirror located in the optical path of said spread function between said means to relay the image and said data pattern,
  (h) A galvanometer to rotate said mirror to sweep said spread function across said data pattern,
  (i) means to correlate the position of said mirror with the signal received from said light intensity measurement.
  (j) said data pattern being mounted stationary with respect to the axis of rotation of said mirror.
  (k) said data pattern being at the image point of said spread function,
  (l) a condensing lens to direct the light beam from said data pattern onto said light intensity measurement means,
  (m) said axis of rotation of said mirror located at the first focal point of said condensing lens,
  (n) said light intensity measurement means located at the second focal point of said condensing lens, whereby the light falling on the detector remains stationary on said light intensity measuring means as said mirror sweeps said spread function image across said data pattern.

13. In a system for measuring the modulation transfer function of an electro-optical system with a characteristic scan rate:
  (a) means for generating an electrical input signal, and applying it to said electro-optical system such that said signal will result in an optical spread function output from said electro-optical system, said optical spread function being said electro-optical system's response to said electrical input signal;
  (b) means to relay the image of said spread function to a data pattern, said data pattern being at the image point of said relay means;
  (c) a mirror located in the optical path of said spread function image between said means to relay said image and said data pattern, a galvonometer to rotate said mirror to sweep said spread function image across said data pattern and said data pattern stationary with respect to the axis of rotation of said mirror;
  (d) means to synchronize the sweep rate of said rotatable mirror with the scan rate of said electro-optical system;
  (e) means to measure the intensity of the light from said image passing through said data pattern;
  (f) means to correlate the position of said mirror with the signal received from said light intensity measurement;
  (g) a condensing lens to direct the light passing through said data pattern onto said light intensity measurement means;
  (h) said axis of rotation of said mirror located at the first focal point of said condensing lens;
  (i) said light intensity measurement means located at the second focal point of said condensing lens, whereby the light falling on the detector remains stationary on said light intensity measuring means as said mirror sweeps said spread function image across said data pattern.

* * * * *